United States Patent [19]

Tsuruta

[11] Patent Number: 5,726,350
[45] Date of Patent: Mar. 10, 1998

[54] CONTOUR MEASURING APPARATUS WITH A STYLUS

[75] Inventor: Atsushi Tsuruta, Kure, Japan

[73] Assignee: Mitutoyo Corporation, Kanagawa, Japan

[21] Appl. No.: 802,943

[22] Filed: Feb. 21, 1997

[30] Foreign Application Priority Data

Feb. 22, 1996 [JP] Japan ................. 8-035215

[51] Int. Cl.⁶ ................................................. G01B 7/28
[52] U.S. Cl. ................................................. 73/105
[58] Field of Search ................. 73/104, 105; 33/551, 33/553–555, 558.01, 558.04, 561, 559; 324/207.18

[56] References Cited

U.S. PATENT DOCUMENTS

| | | | |
|---|---|---|---|
| 4,389,786 | 6/1983 | Sakata et al. | 33/174 P |
| 4,736,208 | 4/1988 | Schmidt | 346/33 R |
| 5,146,690 | 9/1992 | Breitmeier | 33/551 |
| 5,150,314 | 9/1992 | Garratt et al. | 364/571.02 |

FOREIGN PATENT DOCUMENTS

| | | | |
|---|---|---|---|
| 587127 | 4/1947 | United Kingdom | 73/105 |
| 1472628 | 4/1977 | United Kingdom. | |
| 2281779 | 3/1995 | United Kingdom. | |

Primary Examiner—Robert Raevis
Attorney, Agent, or Firm—Webb Ziesenheim Bruening Logsdon Orkin & Hanson, P.C.

[57] ABSTRACT

A detecting device for detecting fluctuation of an arm, to which a stylus is attached, comprises a linear guide installed to an arm supporting member and for guiding vertical or horizontal linear movement, a scale supporting member so installed to the linear guide as to be linearly movable, a jointing mechanism for converting circular arc movement caused by fluctuation of the arm to linear movement of the scale supporting member guided with the linear guide, the jointing mechanism having a jointing pin inserted between a projection integrally formed with the arm at a position of a given distance from an axis supporting part of the arm and the scale supporting member, and a displacement detecting device composed of a scale installed to the scale supporting member for detecting displacement by the linear movement.

11 Claims, 10 Drawing Sheets

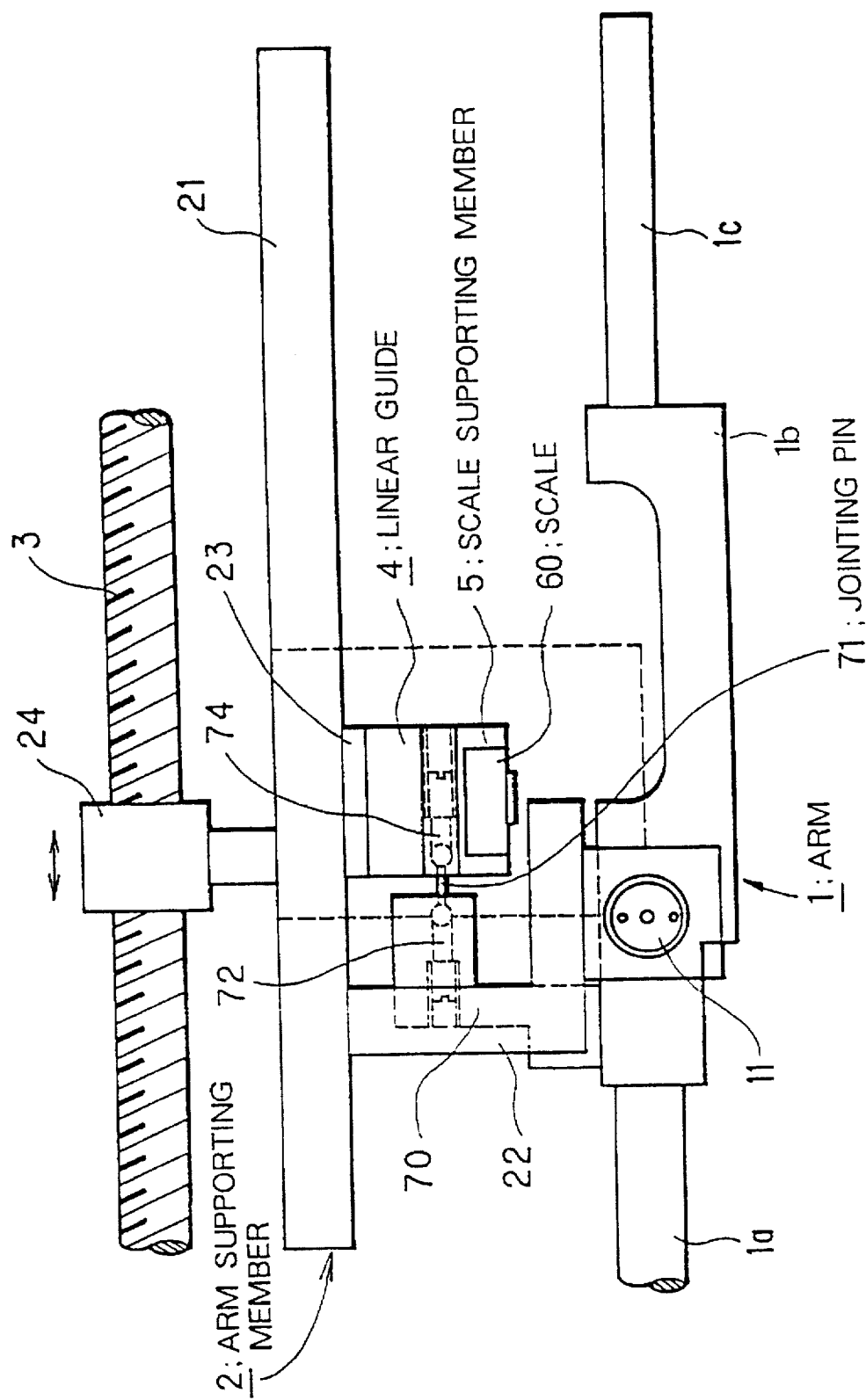

CONTOUR MEASURING APPARATUS WITH A STYLUS

BACKGROUND OF THE INVENTION

1. Field of the Invention

The present invention relates to a contour measuring apparatus for measuring contours of a surface by moving a stylus on the surface of a workpiece to measure unevenness of the surface, and more particularly to an improvement of a fluctuation detecting device for detecting fluctuation of an arm on which the stylus is installed.

2. Prior Art

Conventionally, a measuring apparatus as shown in FIG. 11 has been known as a contour measuring apparatus for measuring contour of surfaces of goods. A column 102 is installed to a base 101, a driving portion 103 and a detecting portion 104 connected with this are mounted to the column 102, and it is possible to adjust positions of height of the driving portion 103 and the detecting portion 104 by a motor 105 installed to the upper end of the column 102. The driving portion 103 comprises a feed mechanism for driving horizontally the detecting portion 104. The detecting portion 104 comprises a detector that supports an arm 107 (107a, 107b) to be fluctuable for attaching a stylus 106 and detects fluctuation of the arm 107.

FIG. 12 shows the concrete structure of the detecting portion 104 and a feed mechanism 81 for driving it. Output of a motor 82 fixed to the driving portion 103 is transmitted through a speed reducing mechanism 83 to a driving shaft 84. A rotary encoder 89 is installed at the end pan of the driving shaft 84. A nut 85 is engaged with the driving shaft 84 and an arm supporting plate 86 connected with the nut 85 is horizontally driven by the driving shaft 84. The arm 107b is supported to be rotatable to a supporting column 87 connected with the arm supporting plate 86 by a pivot bearing 88. A weight 90 for balancing is mounted to be possible to adjust positions at the end part opposite to the stylus 106 of the arm 107b.

By the feed mechanism 81, the arm 107 is horizontally driven so that the stylus 106 of the end is traced on the surface of a workpiece 108 on the base 101, and is rotated (fluctuated) around the pivot bearing 88 by up and down movement of the stylus 106.

The detecting portion 104 comprises a displacement detector 91 for detecting fluctuation of the arm 107. The displacement detector 91 comprises a scale supporting member 92 held by the arm 107, a scale 93 supported by it, and an optical encoder having a light source 94 and a light receiving element 15 that are disposed both sides of the scale 93. The scale supporting member 92 is connected with a supporting body 96 mounted to the arm supporting plate 86 through a parallel linkage 97, and circular arc movement that the pivot bearing 88 of the arm 107 is the center is converted to quasi-linear movement. The light receiving element 95 is loaded in the supporting body 98 installed to the arm supporting plate 86 and is disposed opposite to the scale 93. Therefore, the fluctuation of the arm 107 is converted to the linear movement is transmitted to the scale supporting member 92 and the scale 93, and a displacement output signal corresponding to the fluctuation of the arm 107 is obtained from the light receiving element 95.

Measuring actuating of the contour measuring mechanism is described as follows. The base 101 comprises plural operating buttons electrically connected with the circuit of the driving portion 103, when pressing a start preparing button of them, the arm 107 is horizontally driven in the left direction of the figure by the feed mechanism 81, and the stylus 106 is fed to the measuring starting position at the upper part of the workpiece 108. Further, the driving part 103 and the detecting part 104 are driven downward until the end of the stylus 106 is contacted with the workpiece 108 and the arm 107 is almost horizontal. Next, when pressing the measuring starting button, the motor 82 of the feed mechanism 81 is reversely rotated, the arm supporting plate 86 is horizontally driven in the right direction, therefore, the stylus 106 is moved up and down along the surface of the workpiece 108.

When the stylus 106 is moved up and down, the arm 107 is fluctuated as the pivot bearing 88 is a fulcrum, and it is converted to the linear movement and is detected by the displacement detector 91. The detected displacement signal is transmitted to a electronic circuit portion 100 to be combined with the signal of the rotary encoder 89, and corrected to the actual dimension corresponding to the contour of the surface of the workpiece 108 traced by the stylus 106. The corrected data is stored in a memory device. The data is transmitted to a computer 109, is indicated on a display and is properly processed, whereby gradient is corrected and magnification is changed, and a statistical operation is carried out.

Various detecting methods using a differential transformer and a linear scale have been conventionally proposed as such arm displacement detecting method of the contour measuring apparatus. However, recently a extremely precise linear encoder using a minute scale of order of micrometer and a holography scale has been used. When a parallel linkage is adopted to convert circular arc movement of the arm to linear movement as said prior embodiment in case of using such precise linear encoder, an converting error causes a problem.

This problem will be described referring to FIG. 13A and 13B. In case of using the parallel linkage as shown in FIG. 13B, position deviation x of the scale 93 occurs in the horizontal direction when the scale 93 is moved up an down, whereby deviation of gap distance between the scale 93 and the light receiving part occurs. It is impossible to neglect such a deviation in a precise linear encoder.

Further, the parallel linkage, as shown in FIG. 13A and 13B, comprises many parts such as eight ball bearings and many joints. Therefore, it is necessary to control hard accuracy of processing and assembly. If it is impossible to control enough these precision, it is impossible to give sufficient measuring precision. When the measuring precision actually requested is such that an allowable error is within the range of ±2 μm and an error of fixed point repeating measuring is less than 2 σ=0.5 μm in measuring range of ±20 mm, it is difficult to meet this demand by using the parallel linkage.

SUMMARY OF THE INVENTION

An object of the present invention is to provide a contour measuring apparatus having such an improved fluctuation detecting mechanism that it is easy to process and assemble, and it is possible to measure precisely.

A contour measuring apparatus according to the present invention comprises an arm to which a stylus is attached for tracing a surface of a workpiece, an arm supporting member for supporting the arm with an axis so as to allow the arm to fluctuate around the axis, a driving mechanism for driving horizontally the arm supporting member, and fluctuation detecting means for detecting fluctuation of the arm, wherein the fluctuation detecting means comprises: a linear guide member installed to the arm supporting member; a scale supporting member so installed to the linear guide member as to be linearly movable; jointing mechanism for jointing the arm and the scale supporting member so as to convert circular arc movement caused by fluctuation of the arm to linear movement of the scale supporting member guided by the linear guide member, the jointing mechanism having a jointing pin inserted between the arm and the scale supporting member at a predetermined position distant from the axis, both ends of the jointing pin being so engaged with the arm and the scale supporting member respectively as to be inclinable; and displacement detecting device for detecting the linear movement of the scale supporting member, the displacement detecting device being so composed as to have a scale installed to the scale supporting member.

According to the present invention, a universal joint type jointing mechanism is used for converting the circular arc movement of the arm to the linear movement of the scale supporting member. By combining the jointing mechanism and the linear guide mechanism that installs the scale supporting member to the arm supporting member so as to be vertically or horizontally movable, the circular arc movement is accurately converted to the linear movement given to the scale. Therefore, it is possible to measure accurately displacement in case of using the precise scale and to obtain the contour measuring apparatus that is possible to extremely precisely measure the contour. Further, the structure is simple, it is easy for unskilled persons to assemble extremely precisely and it is possible to obtain the reliable contour measuring apparatus.

BRIEF DESCRIPTION OF THE INVENTION

FIG. 8 is a front view showing the structure of the main part of the driving part of a contour measuring apparatus according to another embodiment of the present invention;

DETAILED DESCRIPTION OF THE PREFERRED EMBODIMENT

Figure 1:
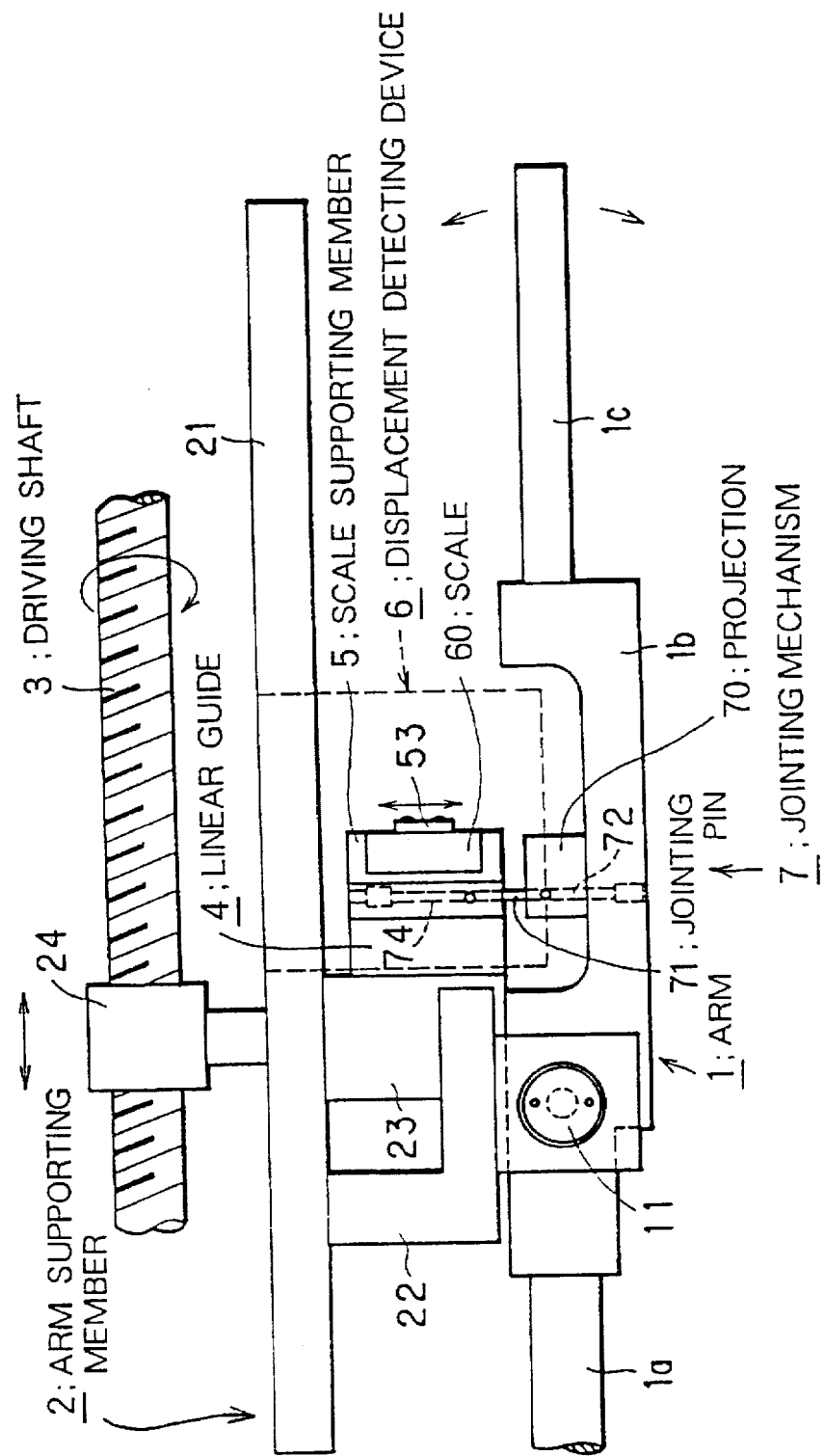
FIG. 1 is a front view showing the structure of the main part of the driving portion of a contour measuring apparatus according to an embodiment of the present invention.

Referring to the drawings, embodiments according to the present invention will be described.

Figure 2:
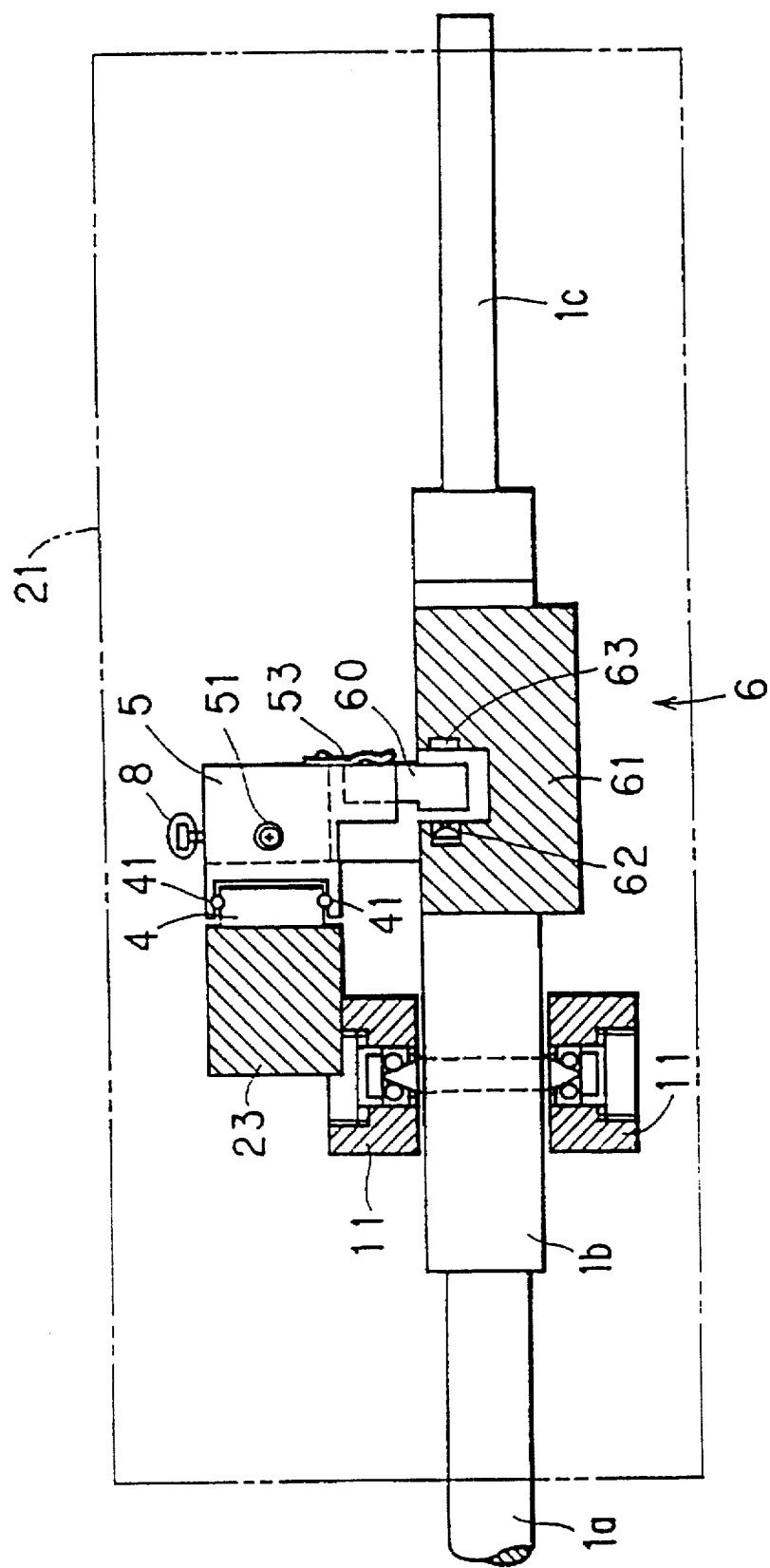
FIG. 2 is a plan view showing the main structure of the driving portion of the embodiment.
Figure 3:
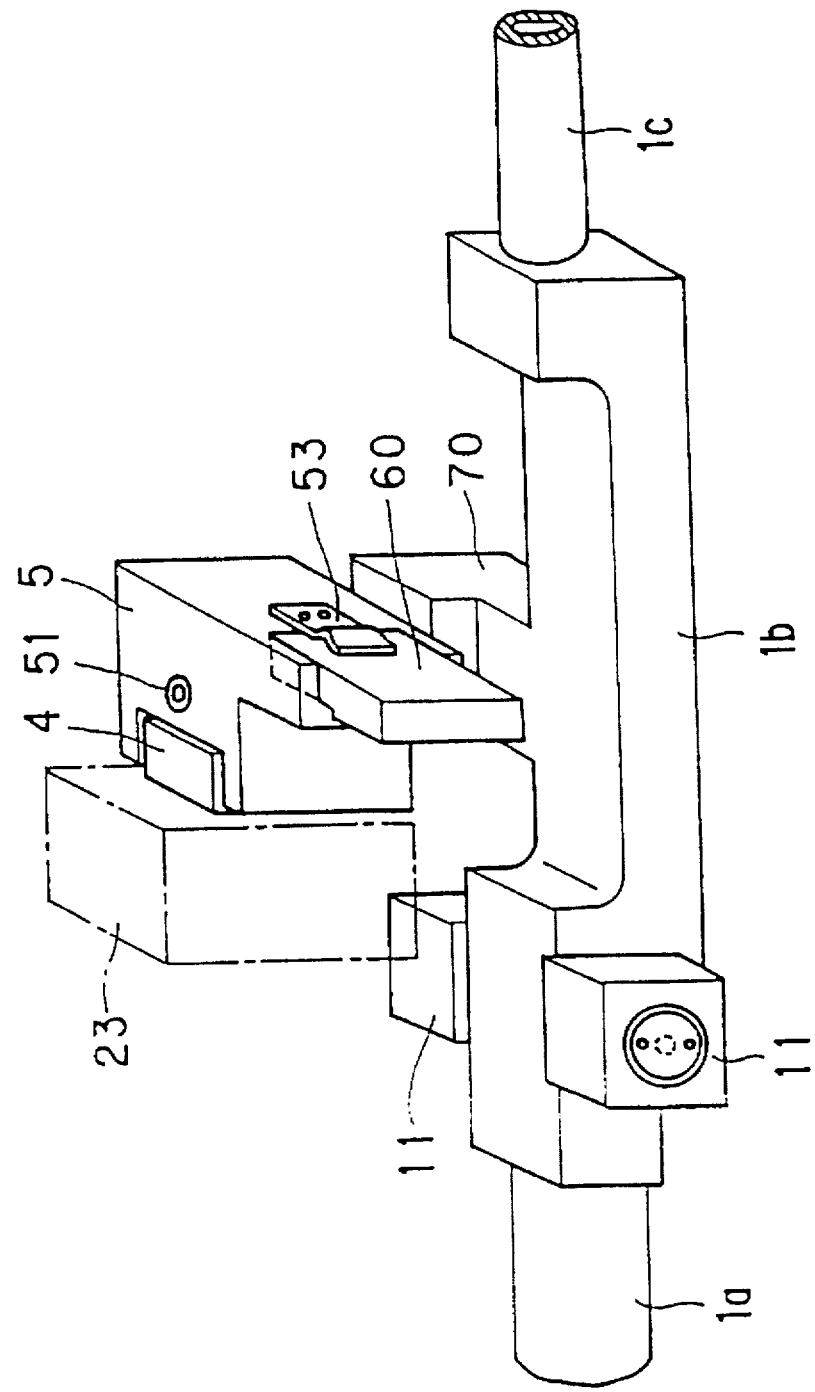
FIG. 3 is a slant view showing the partial structure of the main part of the driving part of the embodiment.
Figure 4:
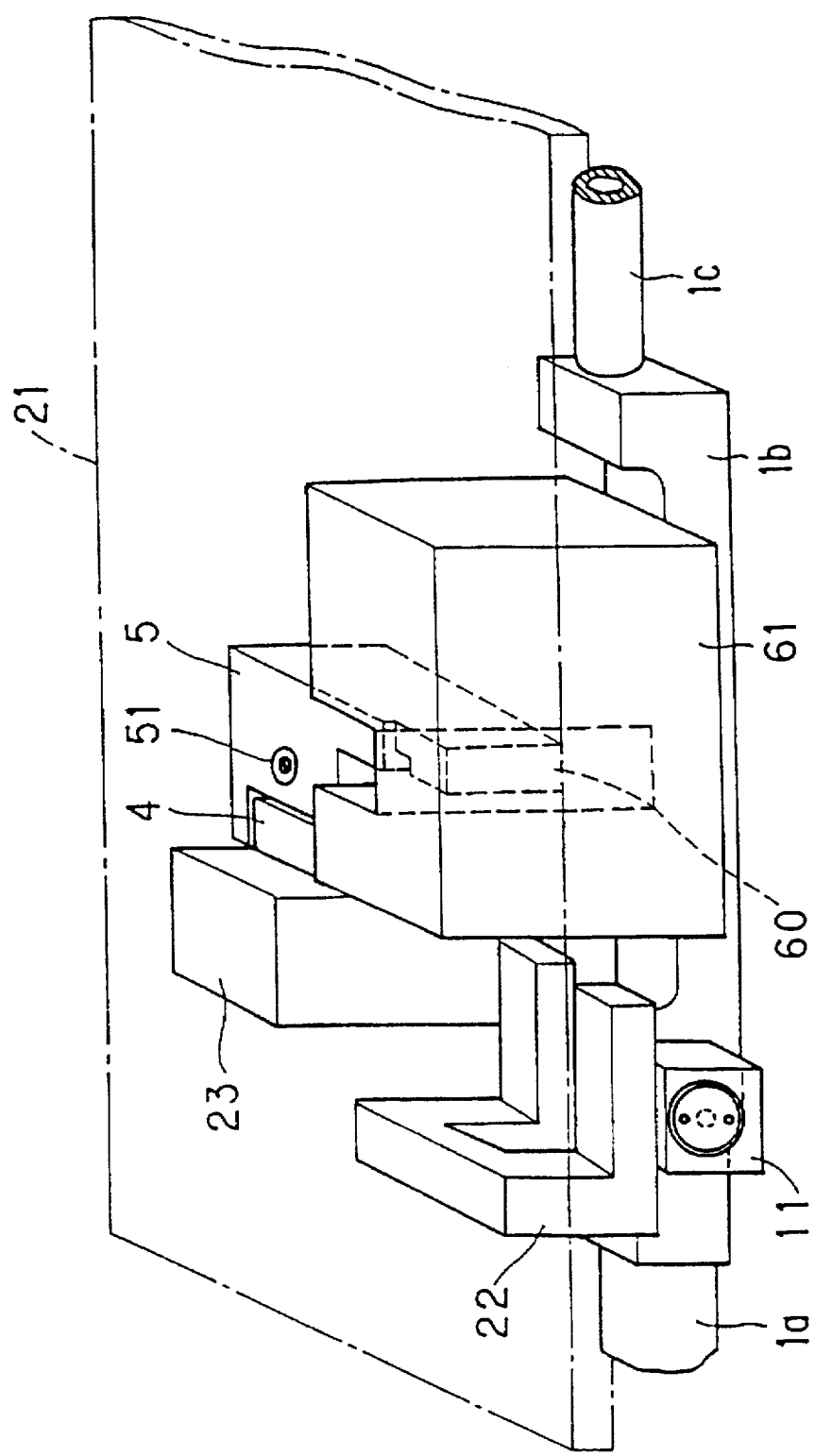
FIG. 4 is a slant view showing the partial structure of the main part of the driving part of the embodiment.

FIG. 1 is a front view showing the structure of the arm driving portion which is a main part of a contour measuring apparatus according to an embodiment of the present invention, FIG. 2 is a plan view, and FIG. 3 and FIG. 4 are partial slant views respectively.

An arm supporting member 2 comprises an arm supporting plate 21, a supporting column 22 installed on the lower surface of the supporting plate 21 and so on. An arm 1 (1a, 1b, 1c). to which a stylus is attached, is rotatably supported on the supporting column 22 by a pivot bearing 11. A driving shaft 3 is so composed as to drive horizontally the arm 1. A nut 24 engaged with the driving shaft 3 is fixed to the arm supporting plate 21, and the arm supporting plate 21 is horizontally driven by rotating the driving shaft 3, whereby the arm 1 is horizontally driven. Similarly to FIG. 8, a stylus installed to the end of the arm 1a is traced on the surface of the workpiece and is moved up and down. The stylus movement causes such fluctuation (rotating movement) of the arm 1 that the pivot bearing 11 is a fulcrum, as shown by arrows.

A fluctuation detecting device for detecting fluctuation of the arm 1 comprises a linear guide 4 installed to a supporting column 23 vertically mounted on the arm supporting plate 21, a scale supporting member 5 that is vertically and linearly slid by the bearing 41 of the linear guide 4, a displacement detector 6 comprising a scale 60 supported by the scale supporting member 5, and a jointing mechanism 7 that is so inserted between the arm 1 and the scale supporting member 5 as to convert circular arc movement caused by the fluctuation of the arm 1 to linear movement guided by the linear guide 4 and transmits it to the scale supporting member 5. The jointing mechanism 7 comprises a jointing pin 71 both ends of which are engaged with the arm 1 and the scale supporting member 5 respectively in such a manner that the jointing pin 71 is inclinable.

Figure 5A:
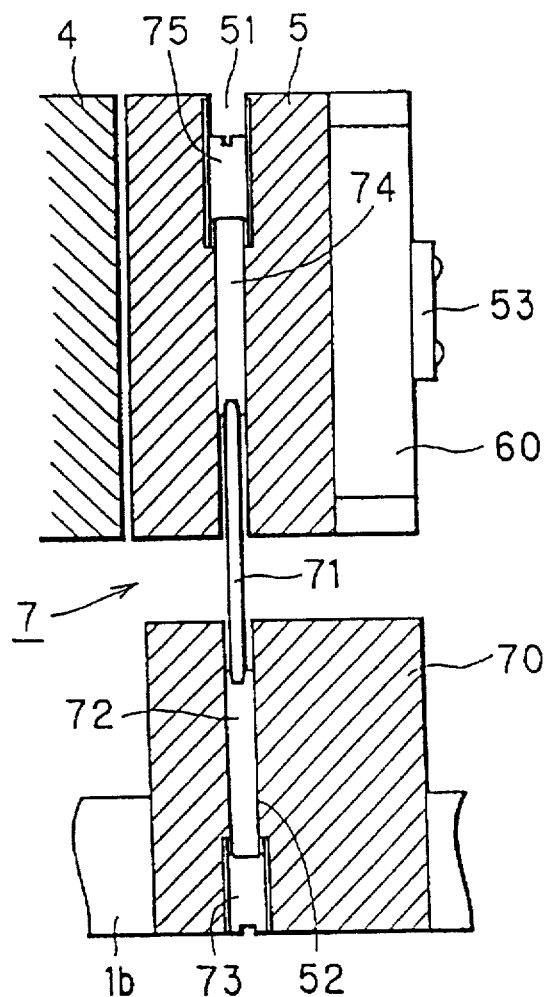
FIGS. 5A and 5B are a cross-sectional front view and a back view showing the concrete structure of the joint mechanism of the embodiment.
Figure 5B:
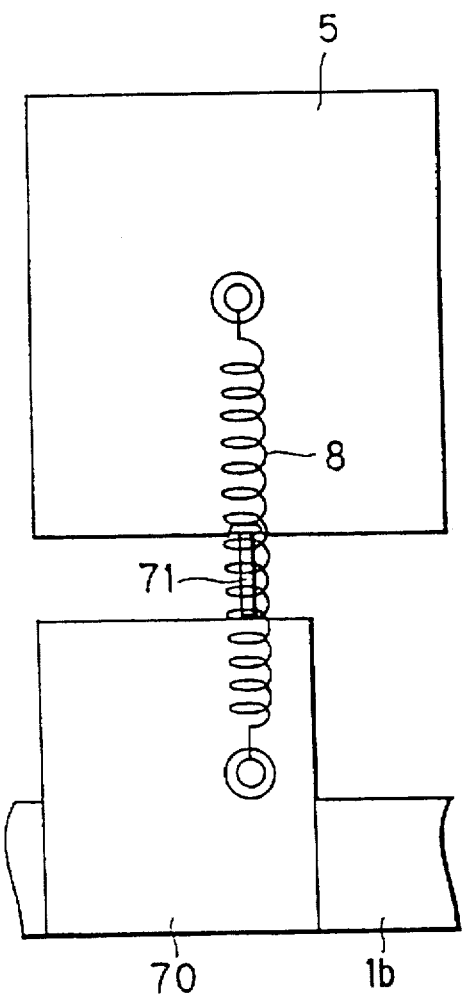

At such a position of the arm 1b as to be horizontally distant from the pivot bearing 11, a projection 70 is integrally formed with the arm 1b so as to be projected on the side of the arm 1b. The projection 70 is moved so as to trace a circular arc in the almost vertical direction corresponding to the fluctuation of the arm 1. The jointing mechanism 7 is installed between the upper end of the projection 70 and the scale supporting member 5 that is so disposed opposite to the upper end of the projection 70 as to be guided vertically and linearly by the linear guide 4. FIGS. 5A and 5B show the front cross sectional view and the back structure of the jointing mechanism 7. As shown in FIGS. 5A and 5B, the projection 70 and the scale supporting member 5 are so formed as to have vertical through holes 52 and 51 facing with each other, and pins with screws 72 and 74 having screw parts 73 and 75 are engaged with those through holes 52 and 51 and buried respectively. Concave parts are formed at the ends of the pins with screws 72 and 74, and the jointing pin 71 having a spherical end that is inserted into those concave parts of the pins with screws 72 and 74, whereby a universal joint type jointing device is composed. In other words, both ends of the connecting pin 71 are so engaged with the ends of the pins with screws 72 and 74 as to be allowed to incline.

By combining the jointing mechanism 7 with the linear guide 4 as above mentioned, the circular arc movement of the arm 1 is transmitted to the scale supporting member 5 guided by the linear guide 4 through the jointing pin 71 as the linear movement. As the jointing pin 71 is followed by the pins with screws 72 and 74 without separating, as shown in FIG. 5B, the projection 70 and the scale supporting member 5 are pulled each other by an extension spring 8 laid over them at the back.

Figure 6:
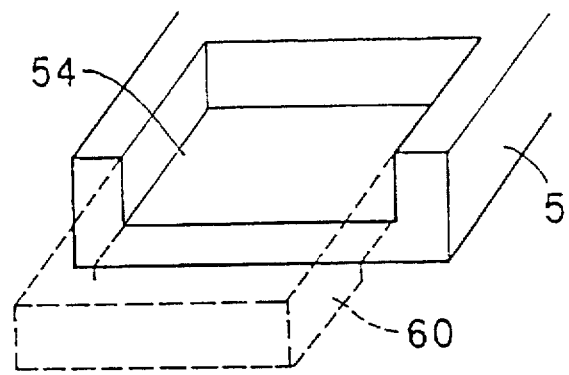
FIG. 6 is a slant view showing the holding structure of a scale of the embodiment.

The scale supporting member 5 comprises a concave part 54 to support the scale 60 as shown in FIG. 6. The scale 60 is, for example, a transmission type scale. The scale 60 is held by a clasp 53. As shown in FIGS. 2 to 4, the displacement detector 6 is such a transmission type optical linear encoder that is constructed by positioning the scale 60 just above the arm 1b and by laying the scale 60 between a light source 62 and a light receiving element 63 in a detector block 61 supported by the arm supporting plate 21.

Figure 7:
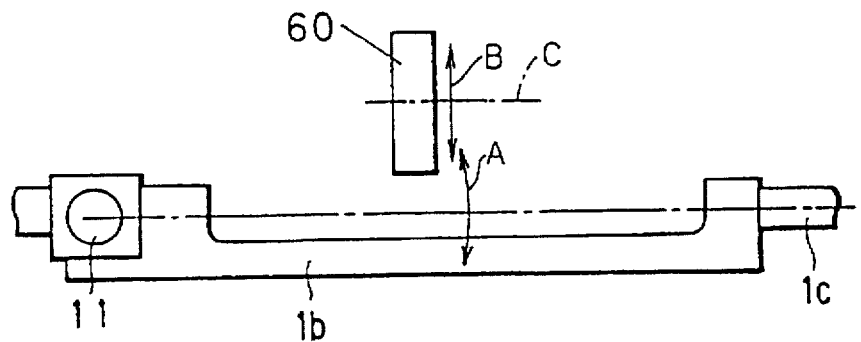
FIG. 7 is a view describing a method for adjusting a scaling position of the embodiment.
Figure 13A:
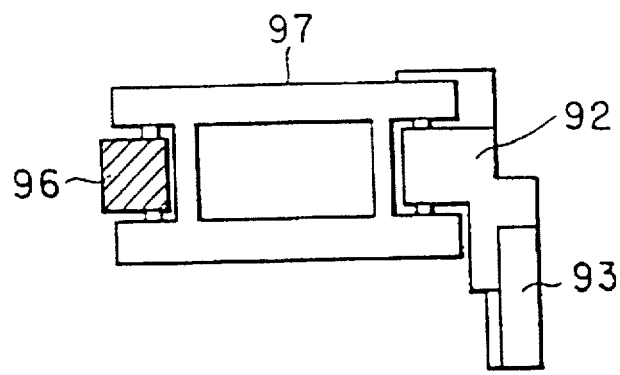
FIGS. 13A and 13B are views showing the parallel link mechanism of the measuring apparatus of FIG. 11.
Figure 13B:
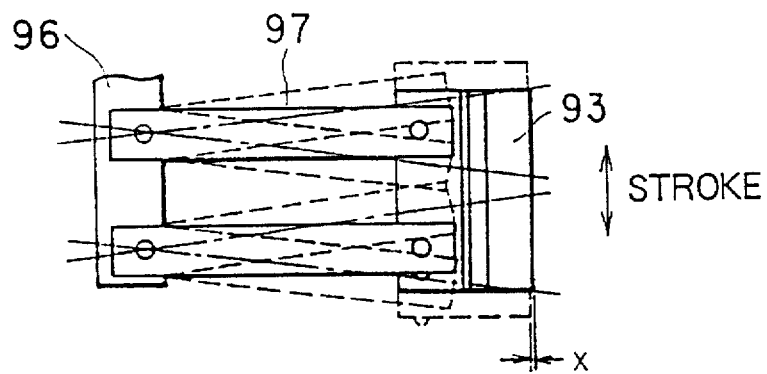

In the jointing mechanism 7, the pins 72 and 74 fitted to the projection 70 and the scale supporting member 5 are provided with the screws, whereby it is possible to adjust the position of the scale supporting member 5 opposite to the projection 70 by adjusting a buried position by adjusting the screw. It is preferred to make the central position of the stroke of the linear movement of the scale 60 according the circular arc movement of the arm 1 agree with the central position of the scale 60. In other words, when the stroke of the circular arc movement of the arm 1 at the position where the scale 60 is disposed is A, and the stroke of linear movement of the scale supporting member 5 that is converted from the circular arc movement is B, as shown in FIG. 7, agree the central position of this stroke B with the central position C of the scale 60. That is to say, adjust the position of the scale 60 by the joint mechanism 7 so that the scale 60 is positioned at the center of the scale 60 when the arm 1 is positioned at the center of the stroke thereof. Thus, it is possible to measure presicely displacement within a wide stroke range.

As above mentioned, according to the embodiment, the circular arc movement of the arm is converted to the correct linear movement by combining the universal joint type jointing mechanism with the linear guide mechanism. As a result, the position deviation of the scale in the horizontal direction in the prior art that detects the displacement of the arm by converting the circular arc movement to the quasi-linear movement by the parallel linkage as described in FIG. 10 does not occur. Thus, according to the present embodiment, it is possible to measure presicely the displacement even in the case of using the minute linear scale, thereby measure accurately contour.

Further, the structure is simple comparing with the case of using the parallel link mechanism, and it is possible even for an unskilled person to easily assemble the contour measuring apparatus, and to obtain the highly reliable contour measuring apparatus.

Since the circular arc movement of the arm is converted to the complete linear movement in the above described embodiment, it is possible to accurately detect the linear displacement. However, the inclined angle of the jointing pin 71 is changed correspondiong to the circular arc movement, whereby the error caused by conversion is included. The conversion error can be corrected by software in processing an output signal.

Figure 9:
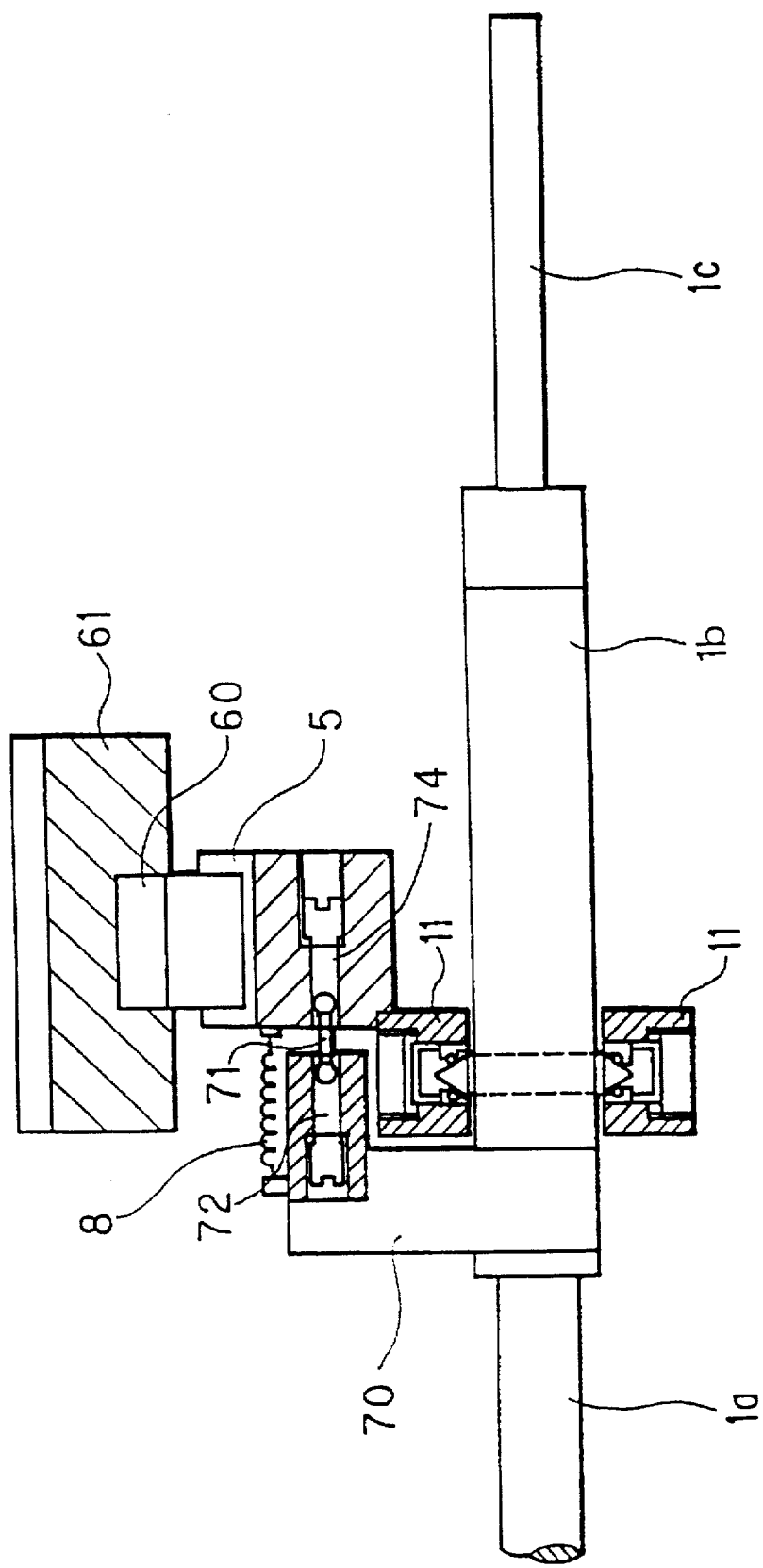
FIG. 9 is a plan view showing the structure of the main part of the embodiment.
Figure 10:
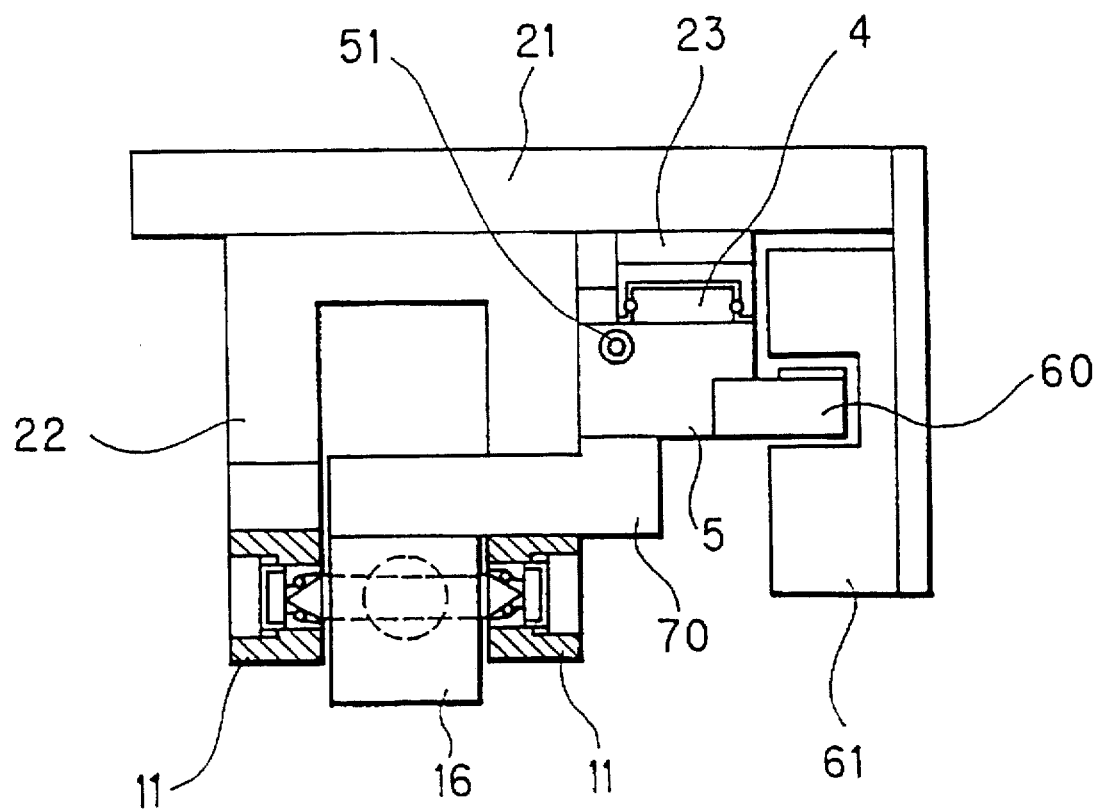
FIG. 10 is a right side view showing the structure of the main part of the embodiment.
Figure 11:
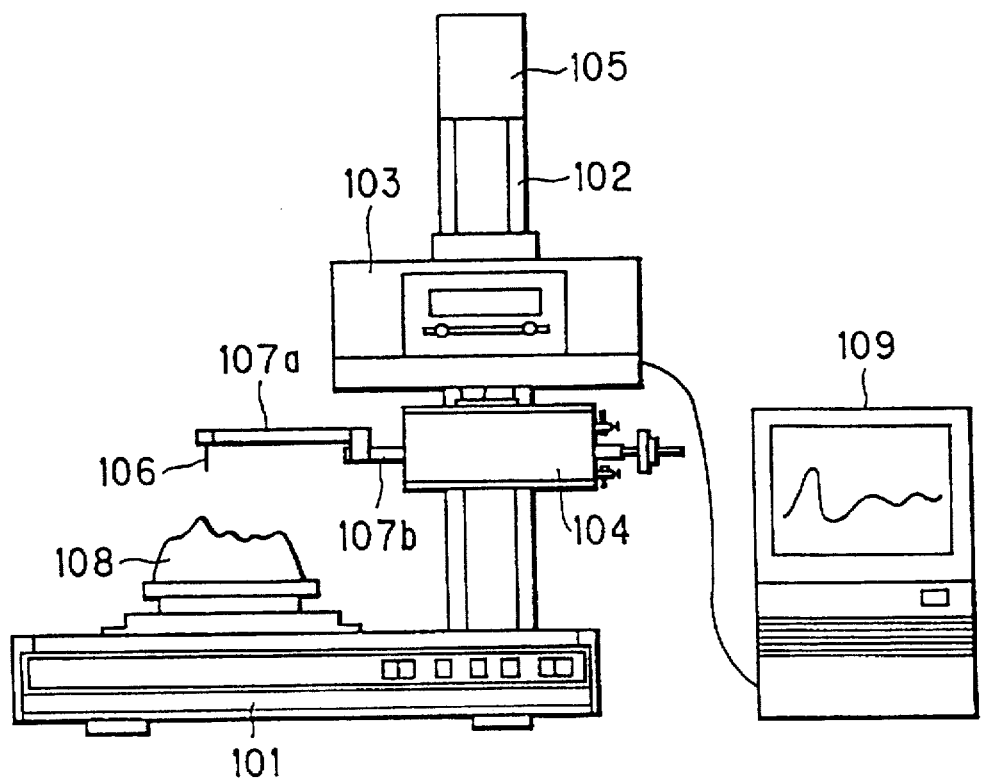
FIG. 11 is a sketch drawing of a prior contour measuring apparatus.
Figure 12:
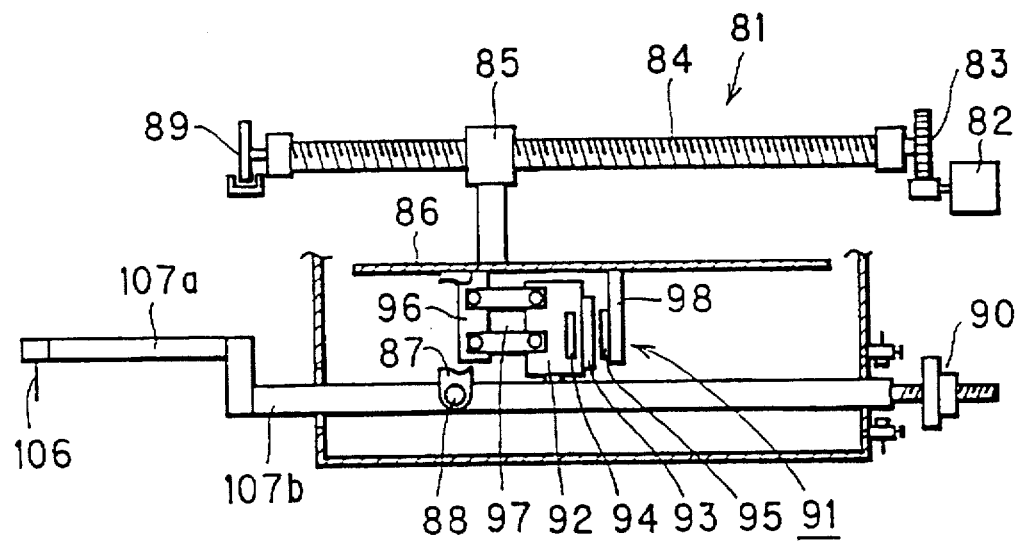
FIG. 12 is a view showing the structure of the driving part of the measuring apparatus of FIG. 11.

In the above described embodiment, the almost vertical circular arc movement caused by the arm is detected by converting the circular arc movement to vertical linear movement. However, it is also possible to construct the fluctuation detecting device such as to converting the almost horizontal circular arc movement corresponding to the arm movement to the horizontal linear movement. In this case, the projection is formed at a vertically distant position from the axis so as to have a side end which makes the almost horizontal circular arc movement. Corresponding to FIG. 1, the front view of such embodiment is shown in FIG. 8. FIG. 9 and FIG. 10 show the plan view and the right side view of the embodiment, respectively. Detailed description of the parts corresponding to the former embodiment is omitted by appending the same reference numerals.

In this embodiment, the projection 70 is fixed to the axis supporting portion of the arm 1 to have a vertical side end that is at a predetermined position vertically distant from the axis. The projection 70 moves to trace almost horizontally and circularly arc according to the fluctuation of the arm 1. The linear guide 4 is the horizontal linear guide mechanism, and the scale supporting member 5 opposite to the side end of the projection 70 is horizontally and slidably installed. The same jointing mechanism 7 as the former embodiment is inserted between the projection 70 and the scale supporting member 5 opposite to the side end of it to convert the almost horizontal circular movement of the projection 70 to the horizontal linear movement of the scale supporting member 4.

According to this embodiment, it is possible to obtain the same effect as the former embodiment. Additionally, since the linear guide is disposed in the horizontal direction, it is hard to cause position deviation of a ball retainer, and it is hard for dust to enter.

The present invention is not limited to said embodiments. For example, although the optical linear encoder is used as the displacement detector in the embodiments, it is also possible to use other type displacement detector such as a differential transformer type displacement detector. Further, though the coil spring connects the projection 70 with the scale supporting member 5, it is also possible to connect elastically by using other elastic members.

Further, although the jointing mechanism 7 for converting the circular are movement to the linear movement comprises the pins with screws buried in the openings penetrating through the inside of the projection 70 and the scale supporting member 5 and the jointing pin for connecting them, it is also possible to construct the same jointing means outside of the projection 70 and the scale supporting member 5.

Furthermore, although the linear guide 4 having the bearing is used in the embodiments, it is possible to use another linear guide member such as a dovetail groove guide.

Furthermore, although the place to detect the fluctuation of the arm 1 is at the predetermined distance opposite side of installing the stylus, on the contrary according to the embodiment in FIG. 1, it is possible to position on the side of the stylus.

As above mentioned, according to the present invention, it is possible to measure accurately the displacement in case of using the precise scale by converting the circular arc movement of the arm to the correct linear movement by combining the universal joint type jointing mechanism with the linear guide mechanism, whereby the contour measuring apparatus that makes possible to measure extremely precisely the contour can be provided. Further, the structure is simple, even unskilled persons are easily possible to assemble precisely and it is possible to obtain the troubleless and reliable contour measuring apparatus.

What is claimed is:

1. A contour measuring apparatus, comprising:

an arm to which a stylus is attached for tracing a surface of a workpiece;

an arm supporting member for supporting the arm with an axis so as to allow the arm to fluctuate around the axis;

a driving mechanism for driving horizontally the arm supporting member; and fluctuation detecting means for detecting fluctuation of the arm, wherein the fluctuation detecting means comprises:

a linear guide member installed to the arm supporting member;

a scale supporting member so installed to the linear guide member as to be linearly movable;

a jointing mechanism for jointing the arm and the scale supporting member so as to convert circular arc movement caused by fluctuation of the arm to linear movement of the scale supporting member guided by the linear guide member, the jointing mechanism having a jointing pin inserted between the arm and the scale supporting member at a predetermined position distant from the axis, both ends of the jointing pin being so engaged with the arm and the scale supporting member respectively as to be inclinable; and displacement detecting means for detecting the linear movement of the scale supporting member, the displacement detecting means being so composed as to have a scale installed to the scale supporting member.

2. The contour measuring apparatus according to claim 1, wherein the linear guide member is so installed to said arm supporting member as to guide vertically the scale supporting member, and said jointing mechanism is installed between a projection that is integrally formed with the arm at a position of a horizontally given distance from the axis of said arm and is circularly moved almost vertically according to said arm fluctuation, said scale supporting member being elastically connected with the projection so as to be opposed to the upper end of the projection.

3. The contour measuring apparatus according to claim 2, wherein the displacement detecting means is a linear encoder comprising the scale so supported by the scale supporting member as to position just above the arm, and the jointing mechanism has position adjusting means for adjusting the position of the scale to be consistent with the center of the scale when the arm is positioned at the center of the stroke.

4. The contour measuring apparatus according to claim 3, wherein the linear encoder is an optical encoder having a light source and a light receiving element for reading the scale supported by the arm supporting member.

5. The contour measuring apparatus according to claim 2, wherein the displacement detecting means is a linear encoder comprising the scale so supported by the scale supporting member as to position just above the arm, and the jointing mechanism has two pins with screws which are screwed into penetrating holes respectively formed through both the projection and the scale supporting member, end portions of the two pins facing with each other, both ends of the jointing pin being so engaged with end portions of the two pins with screws respectively as to be inclinable.

6. The contour measuring apparatus according to claim 5, wherein installed positions of the two pins with screws are adjusted so that the position of the scale is consistent with the center of the scale when the arm is at the center of the stroke.

7. The contour measuring apparatus according to claim 1, wherein the linear guide member is so installed to the arm supporting member as to guide horizontally the scale supporting member, and the jointing mechanism is installed between a projection that is integrally formed with said arm at a position of a vertically given distance from the axis of the arm and is circularly moved almost horizontally according to the arm fluctuation, the scale supporting member being elastically connected with the projection so as to be opposed to the side end of the projection.

8. The contour measuring apparatus according to claim 7, wherein the displacement detecting means is a linear encoder comprising the scale supported by the scale supporting member so as to position just above the arm, and the jointing mechanism has a position adjusting means for adjusting the position of the scale to be consistent with the center of the scale when the arm is positioned at the center of the stroke.

9. The contour measuring apparatus according to claim 8, wherein the linear encoder is an optical encoder having a light source and a light receiving element for reading the scale supported by the scale supporting member.

10. The contour measuring apparatus according to claim 7, wherein the displacement detecting means is a linear encoder comprising the scale supported by the scale supporting member so as to position just above the arm, and the jointing mechanism has two pins with screws which are screwed into penetrating holes respectively formed through both the projection and the scale supporting member, end portions of two pins facing with each other, both ends of the jointing pin being so engaged with end portions of the two pins with screws respectively as to be inclinable.

11. The contour measuring apparatus according to claim 10, wherein installed positions of the two pins with screws are adjusted so that the position of said scale is consistent with the center of said scale when the arm is at the center of the stroke.

* * * * *

UNITED STATES PATENT AND TRADEMARK OFFICE
CERTIFICATE OF CORRECTION

PATENT NO. : 5,726,350
DATED : March 10, 1998
INVENTOR(S) : Atsushi Tsuruta

It is certified that error appears in the above-indentified patent and that said Letters Patent is hereby corrected as shown below:

Column 1 Line 31 "end pan" should read --end part--.

Column 1 Line 59 after "movement" insert --and--.

Column 2 Line 17 "a electronic" should read --an electronic--.

Column 2 Line 29 "a extremely" should read --an extremely--.

Column 2 Line 34 "an converting" should read --a converting--.

Column 2 Line 39 "up an down" should read --up and down--.

Column 2 Line 47 "these precision" should read --these precisions--.

Column 3 Line 33 "BRIEF DESCRIPTION OF THE INVENTION" should read --BRIEF DESCRIPTION OF THE DRAWINGS--.

Column 4 Lines 13-14 after "(1a, 1b, 1c)" delete period and insert comma --,--.

Column 5 Line 5 "are pulled each other" should read --pull to each other--.

Column 5 Line 22 "according the" should read --according to the--.

Column 5 Line 34 "presicely" should read --precisely--.

Column 5 Line 46 "presicely" should read --precisely--.

UNITED STATES PATENT AND TRADEMARK OFFICE
CERTIFICATE OF CORRECTION

PATENT NO.   : 5,726,350
DATED        : March 10, 1998
INVENTOR(S)  : Atsushi Tsuruta It is certified that error appears in the above-identified patent and that said Letters Patent is hereby corrected as shown below:

Column 6 Line 39 "are movement" should read --arc movement--.

Signed and Sealed this

Twenty-first Day of July, 1998

Attest:

Attesting Officer

BRUCE LEHMAN

Commissioner of Patents and Trademarks